Aug. 24, 1937.    R. L. MELTON    2,090,692
CONTROL OF FURNACE TEMPERATURE
Filed Dec. 28, 1934
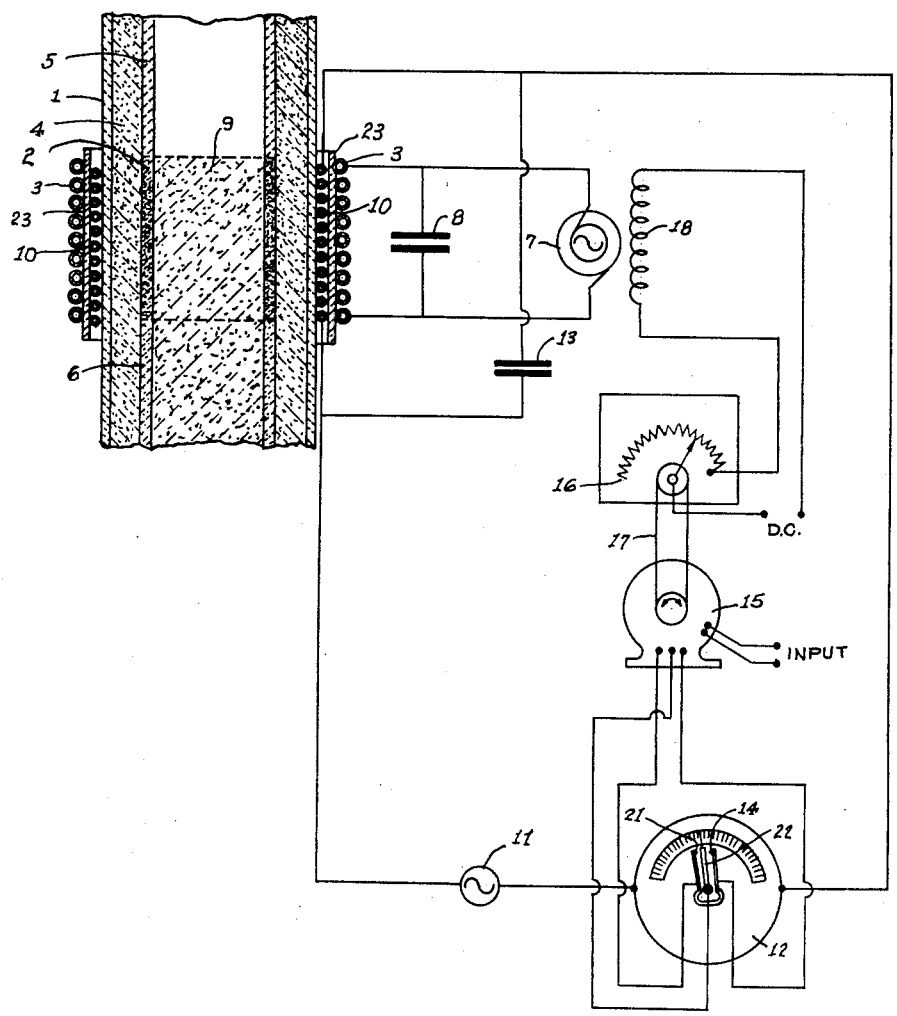
INVENTOR.
ROMIE L. MELTON
BY
ATTORNEY.

Patented Aug. 24, 1937

2,090,692

UNITED STATES PATENT OFFICE 2,090,692

CONTROL OF FURNACE TEMPERATURE

Romie L. Melton, Niagara Falls, N. Y., assignor, by mesne assignments, to The Carborundum Company, Niagara Falls, N. Y., a corporation of Delaware Application December 28, 1934, Serial No. 759,576

2 Claims. (Cl. 219—20)

This invention relates to the operation of furnaces whose use involves heating a carbonaceous body to a predetermined temperature and particularly to means for measuring and controlling the temperature of the material being heated. More specifically this invention relates to apparatus for measuring the resistance of a carbonaceous body and interpreting the measurements in terms of temperature whereby the temperature of the body being measured may be indicated and controlled to any desired degree. The invention is of particular use in connection with induction furnaces.

The use of induction furnaces has been restricted heretofore for certain uses particularly at elevated temperatures above 1500° C. due to the difficulties of measuring and controlling the temperature of the material being heated. This is particularly true in heating articles which are passed through the furnace in a continuous operation and in the manufacture of products such as silicon carbide, which are formed by the reaction of materials at high temperatures and in an enclosed space or reaction chamber.

As described and claimed in a copending patent application Serial No. 659,784, filed March 6, 1933 by Raymond C. Benner, Romie L. Melton and John A. Boyer, silicon carbide can be manufactured in a continuous operation and the crystal size controlled to any desired degree by passing a mixture of silica and carbon through a furnace lined with carbonaceous material and heating the furnace lining to the temperature of formation of silicon carbide by induced electrical currents from an induction furnace coil. The operation of this process requires close control of the furnace temperature in order to produce silicon carbide crystals of a desired size and also to prevent excessive growth of the crystals and plugging of the furnace.

Heretofore the temperature of induction and other furnaces, operating at temperatures in excess of 1500° C., have been determined by sighting into the interior with an optical or radiation pyrometer. These methods have not been satisfactory in the present instance since the measurements are largely influenced by vapors within the furnace and may be in error to the extent of several hundred degrees. In addition the continuous type of furnace is entirely filled with the furnace mixture and converted silicon carbide so that it is not possible to use the above methods of measurement satisfactorily.

I have found that the temperature of a furnace lined with a carbonaceous material can be measured by utilizing the negative temperature coefficient of resistance of the carbonaceous material and measuring the current induced in the said material by an inductively coupled measuring circuit. By proper calibration, the indicating instrument in the external circuit may be made to indicate the temperature of the carbonaceous material and by suitable relays or controls the power input to the heating circuit may be so regulated as to maintain the said material at any desired temperature.

It is well known that the specific resistance of a carbonaceous body, such as commercial grade carbon, decreases with an increase in temperature. Thus the electrical current flowing in such a body at a given potential would vary with the temperature of said carbonaceous body. The present invention utilizes this temperature-resistance characteristic of carbonaceous materials in providing an accurate temperature control of an induction furnace.

The nature of my invention will be more fully evident from a consideration of the accompanying drawing which shows a section of a portion of an induction furnace together with a schematic wiring diagram of the heating and temperature control circuits.

As shown in the drawing a carbonaceous furnace lining 2 is electrically heated by induced currents from the induction furnace coil 3 and thermally insulated from the outer shell 1 by a layer 4 of high temperature heat insulating material, such as powdered carbon or lampblack. This section forms the heating chamber or reaction zone in which high temperature products 9, such as silicon carbide are produced. Sections 5 and 6 which respectively precede and follow the section under treatment can be made of carbon or of recrystallized silicon carbide.

The section 2 forms a single turn secondary of a transformer of which the induction coil 3 is the primary. Thus alternating current of a suitable frequency, supplied by the alternator 7, is induced into the furnace lining 2 from the coil 3 and produces heating of the furnace lining. A condenser 8 is connected across the coil 3 to counteract the high inductive reactance of the said furnace coil 3 and thus maintain substantially a unity power factor in the power supply circuit.

A second coil 10 is inductively coupled with the furnace lining 2 and connected to an alternator 11 which supplies a constant voltage at a suitable frequency. The power in this circuit may be of relatively small value since it is necessary only to induce sufficient current into the furnace to cause a deflection on the instrument 12. A condenser 13 is connected across the coil 10 to correct the power factor and increase the sensitivity of the circuit by operating at or near the resonance point of the circuit. An insulating sheath 23, of such material as mica, is interposed between the coil 10 and the furnace coil 3 to electrically insulate these two circuits.

With certain arrangements of the various elements, and particularly with close coupling of the heating or furnace coil 3 and the measuring coil 10, a change in current through the said heating coil will by inductive action produce a change in the current flowing in the measuring coil and upset the control circuit. Such a disturbing influence, caused by the action of these two magnetic fields, may be eliminated by applying to the measuring circuit coil 10 an alternating current which is double or of some even multiple of the frequency of the alternating current supplied to the heating coil 3, and which passes through the zero portion of its cycle at the same instant as the said heating coil current.

The operation of the device may be described briefly as follows: The material to be heated, as for example a mixture of silica and carbon, is fed into the furnace and heated to the desired temperature as it moves through the heating zone within the section 2. The indicating instrument 12, which may be a suitably calibrated ammeter, wattmeter or admittance meter, is set at a point corresponding to the desired operating temperature. Such temperature is indicated by the pointer 22 which is also provided with suitable contacts and adapted to make and break an electrical control circuit at definite readings above and below the set temperature. Should the temperature of the furnace lining 2 increase to a point above the desired operating temperature the electrical resistance would decrease causing an increase in the induced current from the coil 10. The current flowing in the external circuit from the alternator 11 and measured by the instrument 12 will necessarily be increased to supply the current in the secondary circuit composed of the carbonaceous ring 2. Such increased current causes an increased deflection of the pointer 22 of the meter 12 and causes an electrical contact to be made with the contact 14 completing an electrical circuit to the reversing motor 15 which operates to drive the power alternator field rheostat 16 by the belt or chain 17 so as to decrease the current through the field winding 18 of the alternator 7. This change in field current reduces the output from the alternator and the power supplied to the furnace coil 2, thereby preventing overheating of the furnace.

With a decrease in temperature of the furnace lining 2 the deflection on the instrument 12 is decreased accordingly and an electrical contact made with the contact 21 which causes the motor 15 to change the setting of the field rheostat 16 so as to increase the field current of the alternator 7 and increase the power supplied to the furnace to such a value that the furnace temperature will be increased to the desired value.

By means of the above described control the temperature of an induction furnace having a carbonaceous lining can be automatically held at any desired temperature regardless of variations in the rate of passage of the charge therethrough or of radiation losses.

I claim:

1. The combination comprising a furnace with an electrically conductive non-magnetic lining means for heating said lining comprising a coil around said lining and in inductive relationship to said lining and a source of alternating current connected to said coil, means for inducing an electric current in said lining comprising a coil around said lining and in inductive relationship to said lining and a source of constant potential alternating current the frequency of which is an even multiple of the frequency of the source of alternating current connected to the coil forming part of the heating means for said lining, and means for controlling the output of the source of alternating current forming part of the means for heating said lining comprising a rheostat in the field circuit of said source and means responsive to the quantity of current flowing in the higher frequency coil for operating the said rheostat.

2. The combination comprising a furnace with an electrically conductive non-magnetic lining, means for heating said lining comprising a coil in inductive relationship to said lining and a source of alternating current connected to said coil, a second coil in inductive relationship to and around said lining and a source of constant potential alternating current connected to said second coil, and means responsive to the quantity of electric current flowing in said second coil for controlling the means for heating said lining.

ROMIE L. MELTON.